US011807091B2

(12) United States Patent
Seemann et al.

(10) Patent No.: US 11,807,091 B2
(45) Date of Patent: Nov. 7, 2023

(54) AXLE DRIVE

(71) Applicants: ZF Friedrichshafen AG, Friedrichshafen (DE); ZF Drivetech (Suzhou) Co. Ltd., Suzhou (CN)

(72) Inventors: Frank Seemann, Euerbach (DE); Paul Lenz, Waldkirchen (DE); Andreas Grossi, Kopfing (AT); Werner Hechberger, Fuerstenzell (DE); Kai Borntraeger, Langenargen (DE); Maik Woerl, Immenstaad (DE); Marco Di Sarno, Osnabrück (DE); Cong Ren, Jiang Sui (CN)

(73) Assignees: ZF FRIEDRICHSHAFEN AG, Friedrichshafen (DE); ZF DRIVETECH (SUZHOU) CO. LTD., Suzhou (CN)

( * ) Notice: Subject to any disclaimer, the term of this patent is extended or adjusted under 35 U.S.C. 154(b) by 51 days.

(21) Appl. No.: 17/277,524

(22) PCT Filed: Sep. 13, 2019

(86) PCT No.: PCT/EP2019/074439
§ 371 (c)(1),
(2) Date: Mar. 18, 2021

(87) PCT Pub. No.: WO2020/058101
PCT Pub. Date: Mar. 26, 2020

(65) Prior Publication Data
US 2022/0032756 A1 Feb. 3, 2022

(30) Foreign Application Priority Data
Sep. 19, 2018 (DE) ............ 10 2018 215 934.3

(51) Int. Cl.
B60K 1/02 (2006.01)
B60K 7/00 (2006.01)
B60K 17/04 (2006.01)

(52) U.S. Cl.
CPC ............ B60K 1/02 (2013.01); B60K 7/0007 (2013.01); B60K 17/046 (2013.01);
(Continued)

(58) Field of Classification Search
CPC .................................................. B60K 7/0007
See application file for complete search history.

(56) References Cited

U.S. PATENT DOCUMENTS 9,809,186 B2 11/2017 Hoshinoya et al.
2011/0139522 A1 6/2011 Takenaka et al.
(Continued)

FOREIGN PATENT DOCUMENTS

CN 106864233 A 6/2017
CN 106915232 A 7/2017
(Continued)

OTHER PUBLICATIONS

International Search Report (English Translation) PCT/EP2019/074439, dated Nov. 26, 2019. (2 pages).
(Continued)

*Primary Examiner* — Erez Gurari
(74) *Attorney, Agent, or Firm* — Dority & Manning, P.A.

(57) ABSTRACT

An axle drive (1) for a motor vehicle axle includes at least a first drive unit (2), a second drive unit (2), and an output axle (6). The first and second drive units (2) are arranged such that an overall center of gravity (7) of the axle drive (1) is situated proximate to a center of the output axle (6) and/or an axis of rotation of a vehicle wheel of the motor vehicle driven by the axle drive (1).

8 Claims, 3 Drawing Sheets

(52) U.S. Cl.
CPC ............... *B60K 2007/003* (2013.01); *B60K 2007/0061* (2013.01); *B60Y 2400/73* (2013.01)

(56) References Cited

U.S. PATENT DOCUMENTS

| | | | |
|---|---|---|---|
| 2011/0232984 A1* | 9/2011 | Wurm | B60K 7/0007 180/69.6 |
| 2013/0150211 A1* | 6/2013 | Aoki | B60K 6/46 477/86 |
| 2015/0175202 A1 | 6/2015 | MacGregor et al. | |
| 2016/0229289 A1 | 8/2016 | Frohnmayer et al. | |
| 2017/0050514 A1* | 2/2017 | Li | B60K 1/02 |
| 2018/0250982 A1* | 9/2018 | Albl | B60K 17/04 |

FOREIGN PATENT DOCUMENTS

| | | |
|---|---|---|
| CN | 108128131 A | 6/2018 |
| EP | 0966361 B1 | 12/1999 |
| JP | 2008213775 A | 9/2008 |

OTHER PUBLICATIONS

German Search Report DE102018215934.3, dated Aug. 22, 2019. (12 pages).

\* cited by examiner

US 11,807,091 B2

AXLE DRIVE

CROSS-REFERENCE TO RELATED APPLICATION

The present application is related and has right of priority to German Patent Application No. 102018215934.3 filed in the German Patent Office on Sep. 19, 2018 and is a nationalization of PCT/EP2019/074439 filed in the European Patent Office on Sep. 13, 2019, both of which are incorporated by reference in their entirety for all purposes.

FIELD OF THE INVENTION

The invention relates generally to an axle drive.

BACKGROUND

Driven rigid axle bodies in the field of the heavy vehicle categories (commercial vehicle and bus) are made up of a differential, the output shafts, and the axle body, which is connected via suspension arms or linkages to the superstructure of the vehicle. The arrangement of the components is essentially designed in such a way that the centers of gravity of further axle components are situated coaxially to the axle center. This is mostly due to the design. In the case of axle drives that include further components in addition to the aforementioned components, such as, for example, motors or transmissions, the arrangement thereof can result in a torque about the axle center. This takes place, for example, in designs with a motor instead of a differential housing, wherein, as a result, the suspension arms or linkages for axle guidance are continuously under load, which can negatively affect, in particular, the service life of the bearings and the suspension arms or linkages. The torque about the axle center occurs, in particular, for the case in which vertical accelerations additionally act upon the axle and/or components of the axle.

EP 09 66 361 B1 describes a drive device for an electrically driven vehicle, wherein associated individual wheel drives are associated with each driving wheel. The particular individual wheel drive is arranged in front of or behind the driving wheel in the direction of travel and in the direct proximity of a mounting of the suspension arm or linkage at the vehicle chassis between the mounting of the suspension arm or linkage and the driving wheel, in order to reduce the dynamic inertial forces. The electric motors are arranged as close as possible to the axis of rotation of the suspension arm or linkage heads, so that the dynamic inertial forces have the most minor effect possible.

SUMMARY OF THE INVENTION

Example aspects of the invention provide an arrangement of components of an axle drive, by which torques about the axle center can be avoided and the aforementioned problems can be prevented.

Example aspects of the invention solve the stated problem in that an axle drive is provided, which includes, in addition to an output axle, at least or precisely one first drive unit and one second drive unit. The drive units are arranged in such that the overall center of gravity is situated close to the axle center of the output axle and/or an axis of rotation of a vehicle wheel driven by the axle drive. The output axle forms, in particular, a common output axle of the drive units.

The first drive unit and the second drive unit can be arranged symmetrically about an axle center of the output axle. In addition, it is advantageous when the drive units are arranged at an equal distance from the output axle. In addition, input axles of the drive units can be arranged at the same height as the output axle.

The drive units preferably each include an electric machine and a transmission, wherein the transmissions can be of a countershaft design or designed as planetary transmissions. Alternatively, the drive units can each include an electric machine, which are designed with a common transmission. This common transmission can also be of a countershaft design or designed as a planetary transmission. The electric machines are preferably identically designed.

BRIEF DESCRIPTION OF THE DRAWINGS

Example aspects of the invention are explained in greater detail with reference to figures. Wherein.

DETAILED DESCRIPTION

Figure 1:
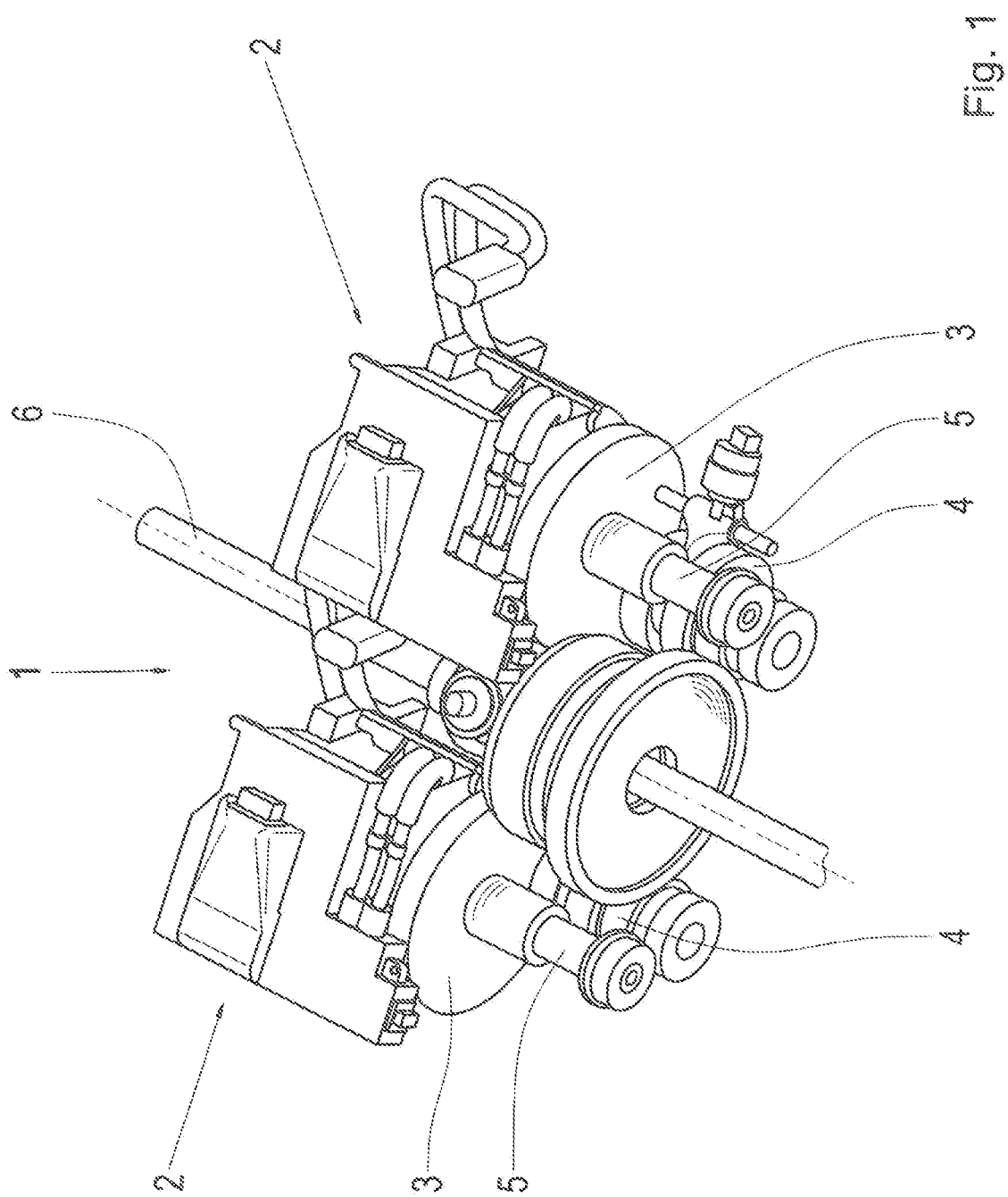
FIG. 1 shows an electric axle drive with a symmetrical arrangement of the electric machines and transmissions of a countershaft design.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows an electric axle drive 1 designed according to example aspects of the invention for electrically driving a motor vehicle axle with a symmetrical arrangement of the drive units 2. The drive units 2 are each made up of an electric machine 3 and a transmission 4 associated with the particular electric machine 3. The input axles 5 of the drive units 2 are arranged axially parallel and symmetrically with respect to the output axle 6 in the axle center of the motor vehicle axle. This axle center also corresponds to the axis of rotation of a vehicle wheel of the motor vehicle axle driven by the output axle 6. Such a vehicle wheel is represented in the background, by way of example, in FIG. 2.

Figure 2:
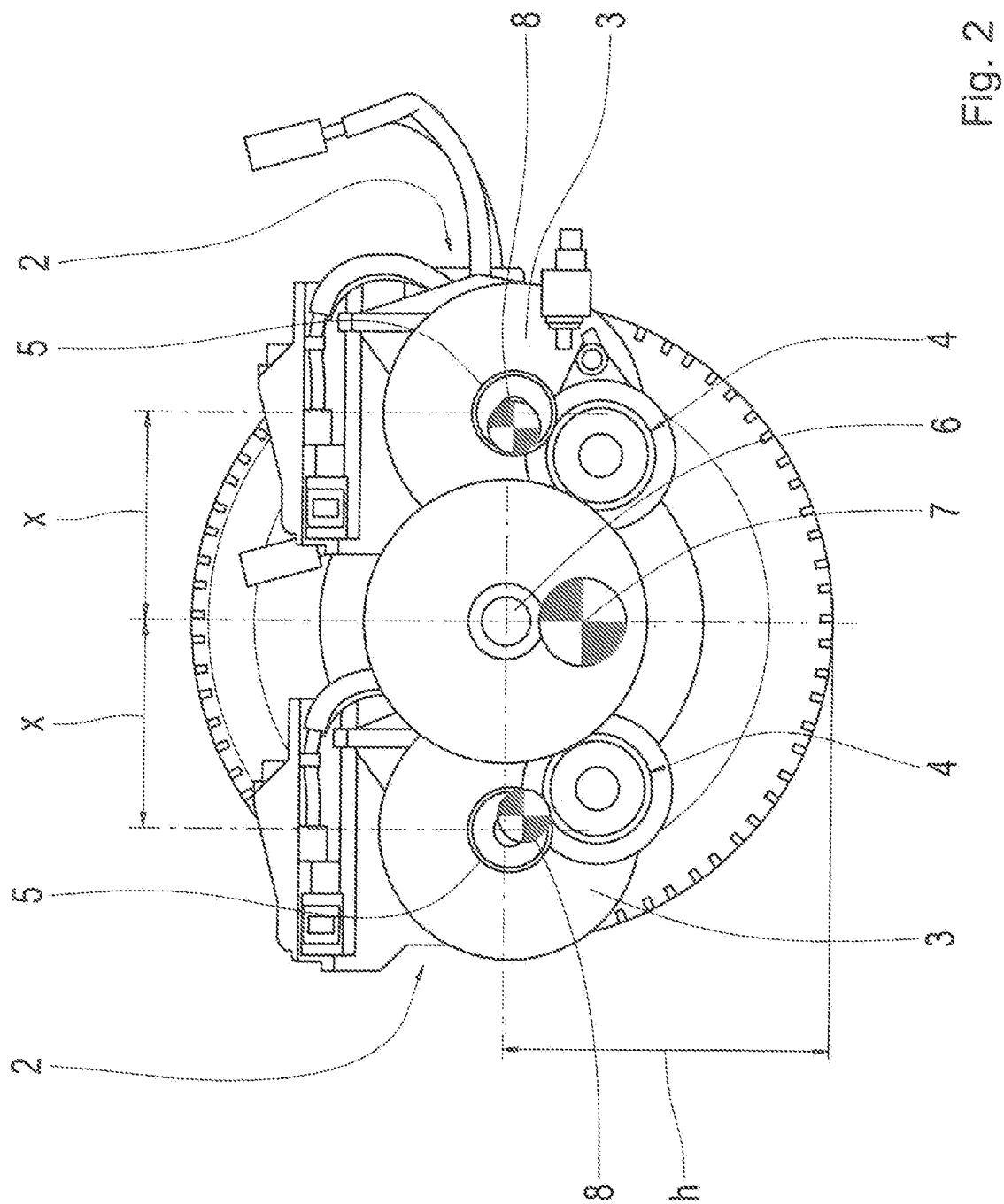
FIG. 2 shows a sectional view of FIG. 1.

FIG. 2 shows a sectional view through the axle drive 1 from FIG. 1. The drive units 2 and the respective center of gravity 8 for each drive unit 2 are arranged in such a way that the overall center of gravity 7 of the motor vehicle axle is situated close to the axis of rotation of the vehicle wheel driven by the output axle 6. Here, the axis of rotation is simultaneously situated in the axle center of the output axle 6 and/or in the wheel center. The drive units 2 are positioned symmetrically about the axle center of the output axle 6. This means, the input axles 5 of the drive units 2 are positioned at an equal distance x to the axle center of the output axle 6.

Figure 3:
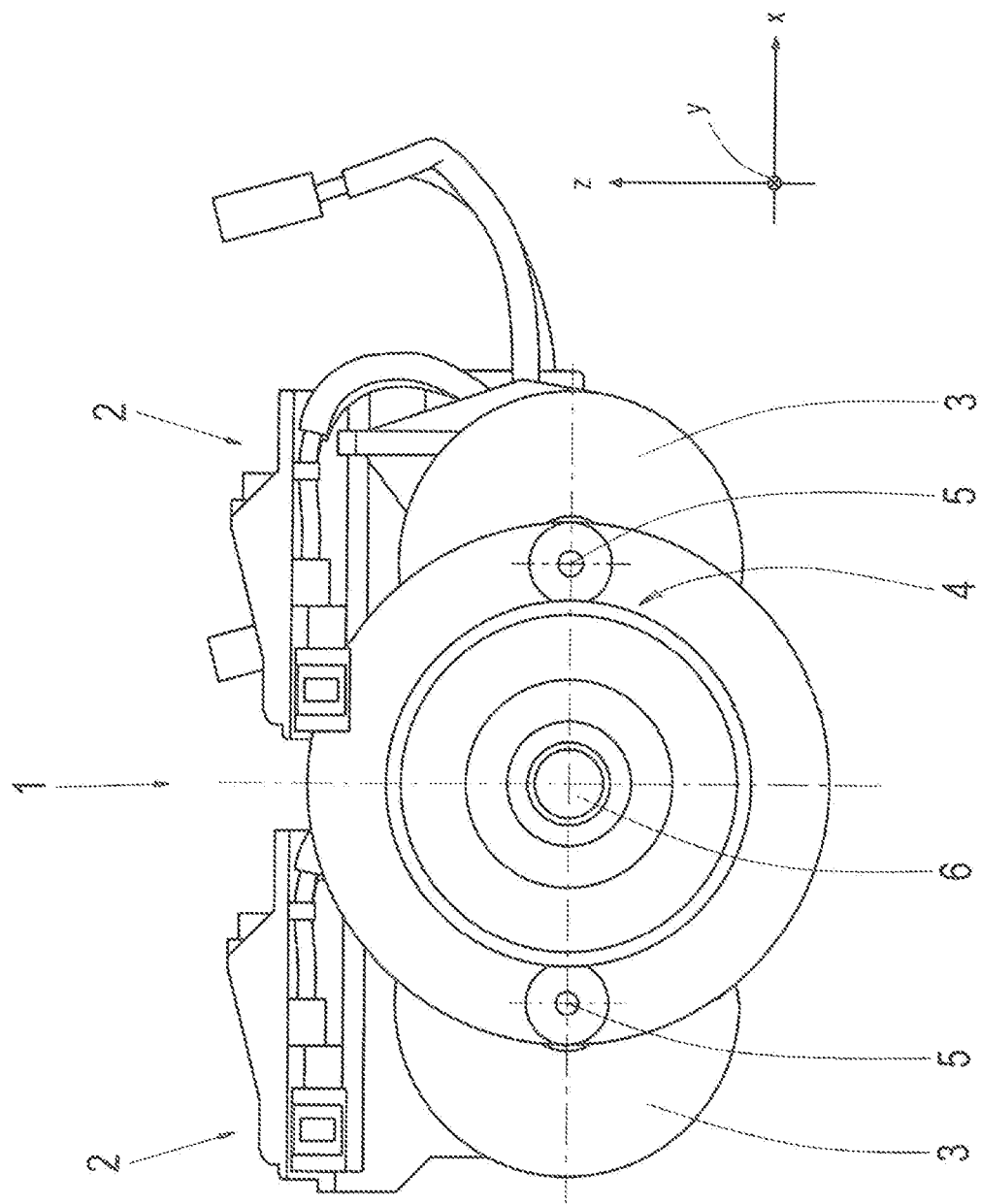
FIG. 3 shows an electric axle drive with a symmetrical arrangement of the drive units and a common planetary transmission.

FIG. 3 shows the electric axle drive 1 with a symmetrical arrangement of the electric machines 3 in connection with a common transmission 4 of a planetary design. The transmission 4 is connected via a summarizing gear to the output axle 6. The input axles 5 and the output axle 6 are arranged at the same height z. In addition, the drive units 2 are arranged at the same distance x to the output axle 6. The drive units 2 and/or the input axles 5 have no lateral offset y with respect to one another.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 axle drive
2 drive unit
3 electric machine
4 transmission
5 input axle
6 output axle
7 overall center of gravity of the motor vehicle axle
8 individual center of gravity of the drive unit
x distance of the component to the axle center in x-direction
z, h distance of the axles in z-direction/height h
y lateral offset

The invention claimed is:

1. An axle drive (1) for a motor vehicle axle, comprising:
a first drive unit (2);
a second drive unit (2); and
an output axle (6),
wherein the first and second drive units (2) are positioned such that an overall center of gravity (7) of the axle drive (1) is situated proximate a center of the output axle (6) and/or an axis of rotation of a vehicle wheel driven by the axle drive (1), and
wherein each of the first and second drive units (2) comprises a respective input axle (5), and the input axles (5) of the first and second drive units (2) are arranged at the same height (z) as the output axle (6).

2. The axle drive (1) of claim 1, wherein the first and second drive units (2) each include an electric machine (3) and a transmission (4).

3. The axle drive (1) of claim 2, wherein each of the transmissions (4) is a countershaft transmission or is a planetary transmission.

4. The axle drive (1) of claim 1, wherein the first and second drive units (2) each include an electric machine (3), and the first and second drive units (2) share a common transmission (4).

5. The axle drive (1) of claim 4, wherein the common transmission (4) is a countershaft transmission or is a planetary transmission.

6. The axle drive (1) of claim 1, wherein the first and second drive units (2) are arranged symmetrically about the center of the output axle (6).

7. The axle drive (1) of claim 1, wherein the first and second drive units (2) are each arranged equidistant from the output axle (6).

8. An axle drive (1) for a motor vehicle axle, comprising:
a first drive unit (2);
a second drive unit (2); and
an output axle (6),
wherein the first and second drive units (2) are positioned such that an overall center of gravity (7) of the axle drive (1) is situated proximate a center of the output axle (6) and/or an axis of rotation of a vehicle wheel driven by the axle drive (1), and
wherein each of the first and second drive units (2) comprises a respective input axle (5), and there is no lateral offset (y) between the input axles (5) of the first and second drive units (2).

* * * * *